United States Patent [19]
Hawarden et al.

[11] Patent Number: 5,828,974
[45] Date of Patent: Oct. 27, 1998

[54] REVERSE ENGAGEMENT INTERLOCK CONTROL

[75] Inventors: Jeffrey Philip Hawarden, Rossendale; Michael Douglas Whitehead, Manchester; Paul Martin Fowler, Lymm; Robert Stanley Wheeler, Preston; Anthony Stasik, Coppull, all of England

[73] Assignee: Eaton Corporation, Cleveland, Ohio

[21] Appl. No.: 938,038

[22] Filed: Sep. 26, 1997

Related U.S. Application Data

[63] Continuation of Ser. No. 421,104, Apr. 13, 1995, abandoned.

[30] Foreign Application Priority Data

May 5, 1994 [GB] United Kingdom .................... 9408883
Feb. 3, 1995 [GB] United Kingdom .................... 9502207

[51] Int. Cl.$^6$ .................................................. G06G 7/70
[52] U.S. Cl. ................... 701/64; 701/51; 701/52; 701/66; 74/335; 74/336 R; 477/120; 477/124
[58] Field of Search ........................ 701/51, 52, 53, 701/64, 66; 74/335, 336 R, 473.1; 477/120, 121, 124, 125, 154, 78, 80

[56] References Cited

U.S. PATENT DOCUMENTS

| | | | |
|---|---|---|---|
| 4,361,060 | 11/1982 | Smyth | 477/120 |
| 4,430,911 | 2/1984 | Morscheck | 477/124 |
| 4,438,666 | 3/1984 | Lane | 477/122 |
| 4,476,748 | 10/1984 | Morscheck | 477/122 |
| 4,595,986 | 6/1986 | Daubenspeck et al. | 364/424.1 |
| 4,648,290 | 3/1987 | Dunkley et al. | 477/120 |
| 5,109,729 | 5/1992 | Boardman | 74/858 |
| 5,207,617 | 5/1993 | Kato et al. | 477/41 |
| 5,252,861 | 10/1993 | Steeby et al. | 307/10.6 |
| 5,261,288 | 11/1993 | Menig | 74/335 |
| 5,261,298 | 11/1993 | Markyrech | 477/124 |
| 5,272,441 | 12/1993 | Wright et al. | 324/546 |
| 5,429,559 | 7/1995 | Steeby | 477/80 |
| 5,436,833 | 7/1995 | Janecke | 364/424.1 |
| 5,441,463 | 8/1995 | Steeby | 477/79 |
| 5,444,623 | 8/1995 | Genise | 364/424.1 |

*Primary Examiner*—Jacques H. Louis-Jacques
*Attorney, Agent, or Firm*—Howard D. Gordon

[57] ABSTRACT

A control method/system for controlling engagement of reverse ratios in automated vehicular transmission systems (10) having a controller (38) issuing command output signals to non-manually controlled actuators (30, 34) is provided. The controller includes logic rules for (i) sensing predetermined reverse ratio enabling conditions, including remaining in neutral for at least a predetermined period of time ($N_T$>$REF_2$) prior to selecting reverse, and (ii) issuing commands to cause a reverse ratio to be engaged only upon sensing such conditions, to minimize accidental engagement of reverse ratios without requiring mechanical interlocks.

30 Claims, 5 Drawing Sheets

REVERSE ENGAGEMENT INTERLOCK CONTROL

This application is a continuation of application Ser. No. 08/421,104, filed Apr. 13, 1995 now abandoned.

BACKGROUND OF THE INVENTION

1. Related Applications

This application claims priority from GB 9408883.8, filed May 5, 1994, and GB 9502207.5, filed Feb. 3, 1995.

This application is related to allowed U.S. Ser. No. 08/104,699 titled SCROLLING GEAR RATIO SELECTION CONTROL SYSTEM AND METHOD, filed Aug. 11, 1993, now U.S. Pat. No. 5,416,700, and assigned to EATON CORPORATION, the assignee of this appication.

2. Field of the Invention

This invention relates to a control system/method for allowing engagement of the reverse ratio(s) of a vehicular automated transmission only upon the occurrence of a predetermined set of reverse enabling conditions. In particular, the present invention relates to a control system/method for an automated transmission system having a controller for issuing command output signals to a non-manually controlled transmission actuator which allows/causes issuing of commands for engagement of the transmission reverse ratio(s) only upon sensing the occurrence of a predetermined set of reverse ratio enabling conditions, including at least one condition involving a predetermined continuing action by the vehicle operator, such as continuing to maintain a selector or button in a position against a bias for at least a predetermined period of time and, thus, does not require mechanical interlock devices to reduce the likelihood of accidental or unintentional engagement of a reverse ratio.

DESCRIPTION OF THE PRIOR ART

Fully or partially automated vehicular transmission systems having a controller, usually microprocessor-based, for receiving input signals and for processing same in accordance with predetermined logic rules to issue command output signals to various non-manually controllable actuators (such as transmission actuators) are well known in the prior art, as may be seen by reference to U.S. Pat. Nos. 4,081,065; 4,361,060; 4,595,986; 4,646,290; 5,053,961; 5,261,298 and 5,335,566, the disclosures of which are incorporated herein by reference.

Mechanical interlock devices (such as detents, movable collars and the like) to prevent accidental selection of reverse ratios in both automatic and manual transmissions are well known in the prior art, as are interlock devices and/or controls which will prevent engagement of a reverse ratio if vehicle forward speed is greater than a predetermined reference value.

While these interlocks and controls are widely used, they are not totally satisfactory, as the mechanical devices are expensive, bulky and/or subject to damage, wear, deflection and/or tampering, and the speed-related controls will not prevent accidental and/or unintentional engagement of a reverse ratio from a stopped or low-speed vehicle condition.

SUMMARY OF THE INVENTION

According to the instant invention, the drawbacks of the prior art are minimized or eliminated by the provision of a reverse ratio engagement interlock control method/system for an automated vehicular transmission which will decrease the likelihood of accidental/unintentional engagement of a transmission reverse ratio without depending upon mechanical interlocks.

The foregoing is accomplished, in a vehicular automated transmissions system having a controller for receiving input signals and for processing same according to predetermined logic rules to issue command output signals to non-manually controlled actuators, by providing reverse ratio engagement logic rules by which the controller will issue the commands necessary for driving engagement of the transmission system in a reverse ratio only upon sensing the occurrence of a predetermined set of reverse ratio engagement enabling conditions, including at least one condition involving a predetermined continuing action by the vehicle operator. By way of example, the reverse ratio engagement logic rules may require sensing that (i) the transmission selector has been in the neutral position for at least a first reference period of time (such as one to two seconds), and then (ii) the operator has moved a button or lever to and has retained the button or lever in a predetermined reverse selection position against a bias. As a further example, application of the vehicle brakes may be an additional or alternative precondition for issuing command output signals for driving engagement of the automated transmission reverse ratio(s).

Accordingly, it is an object of the present invention to provide an improved control for vehicular automated transmission systems for reducing the likelihood of accidental/unintentional engagement of the transmission reverse ratio (s) without requiring mechanical interlock devices.

This and other objects and advantages of the present invention will become apparent from a reading of the detailed description of the preferred embodiments taken in connection with the attached drawings.

DESCRIPTION OF THE PREFERRED EMBODIMENT

Figure 1:
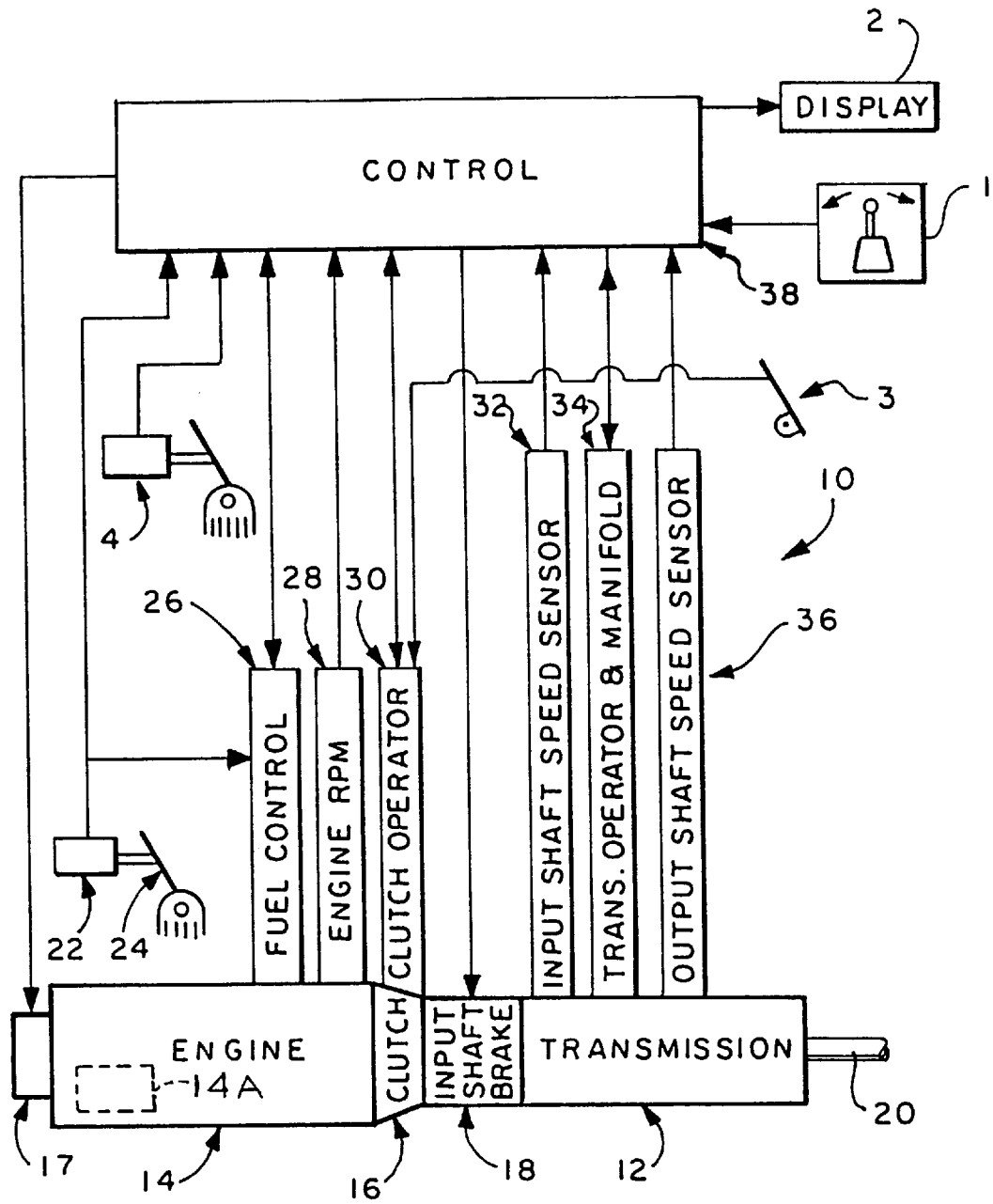
FIG. 1 is a schematic illustration of an automated mechanical change-gear transmission system advantageously incorporating the reverse ratio engagement control of the present invention.

A vehicular semi-automatic mechanical transmission system 10 is schematically illustrated in FIG. 1. While the present invention is illustrated as incorporated into a semi-automated mechanical transmission system, it is understood that the control of the present invention is appicable to various types of fully and partially automated vehicular transmission systems having a controller for receiving input signals indicative of system operating parameters and/or operator requests and for processing same according to predetermined logic rules to issue command output signals to non-manually controllable system actuators.

The semi-automatic transmission system to which the present invention is particularly advantageously related is described and illustrated in European Patent No. EP-B-0 170

465 and U.S. Pat. No. 4,648,290. The type of transmission automated may be of the type illustrated in U.S. Pat. Nos. 4,735,109 and 4,745,665, the disclosures of which are incorporated herein by reference.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged.

The throttle position sensor 24 may be of the type illustrated in U.S. Pat. No. 4,922,425, the disclosure of which is incorporated herein by reference. Devices, such as throttle position sensor assembly 22, for sensing the operators setting of a throttle pedal 24 or the like, and providing a signal proportional to or at least indicative of the monitored setting, and so-called "remote fuel control" or "fly-by-wire" systems utilizing same, are known in the prior art and illustrated in U.S. Pat. Nos. 4,250,845; 4,305,359; 4,319,658 and 4,461,254, the disclosures of which are incorporated herein by reference.

Control logic circuits, sensors and actuators for the transmission system 10 (as disclosed in FIGS. 1 and 2) may be as disclosed in above-mentioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to control the supply of fuel to the engine 14 to achieve rapid synchronous rotation preparatory to a shift, clutch control via operator 30, and ratio shifting via transmission operator 34. The transmission operator 34 may also be of the "X-Y" type, as illustrated in U.S. Pat. Nos. 4,873,881 and 4,899,607, the disclosures of which are incorporated herein by reference.

Engine 14 may be electronically controlled, may include a dedicated controller 14A, and may communicate with ECU 38 by means of an electronic data link conforming to a protocol such as ISO 11898, SAE J1922, SAE J1939 or the like.

Although clutch pedal 3 is illustrated for use in start-from-stop and low-speed maneuvering, the present invention also is applicable to systems having fully automated master clutches and/or torque converters or other non-positive couplings.

The central processing unit also sends command output signals to the display 2, to be described in greater detail below. The semi-automatic transmission system 10 may additionally comprise a usual foot-operated manual clutch control 3 intended for use only for start-from-rest and/or low-speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of which are incorporated herein by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2'", the shift select lever 1, an optional reverse enable button 1A, as well as a central processing unit electronic circuitry 38B.

Figure 2A:
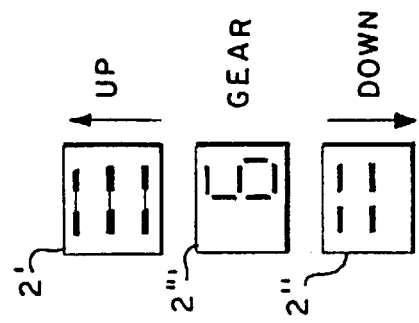
FIGS. 2A and 2B are enlarged views of a portion of the display illustrated in FIG. 2.
Figure 2B:
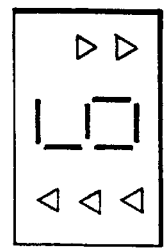

Referring to FIG. 2A, the display 2 includes upshift indicator section 2', downshift indicator section 2" and currently engaged gear ratio indicator section 2'". As illustrated, the currently engaged gear ratio display section 2'" is presently displaying a "6," indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, double or triple upshift is permissible. Accordingly, the driver may select a permissible shift directly to either seventh, eighth or ninth speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or to fourth gear. FIG. 2B illustrates an alternate display utilizing up/down arrows.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 2B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but usually, the driver already will have been advised by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command, even though synchronization of the mechanical jaw clutch elements could be obtained by the system.

Figure 2:
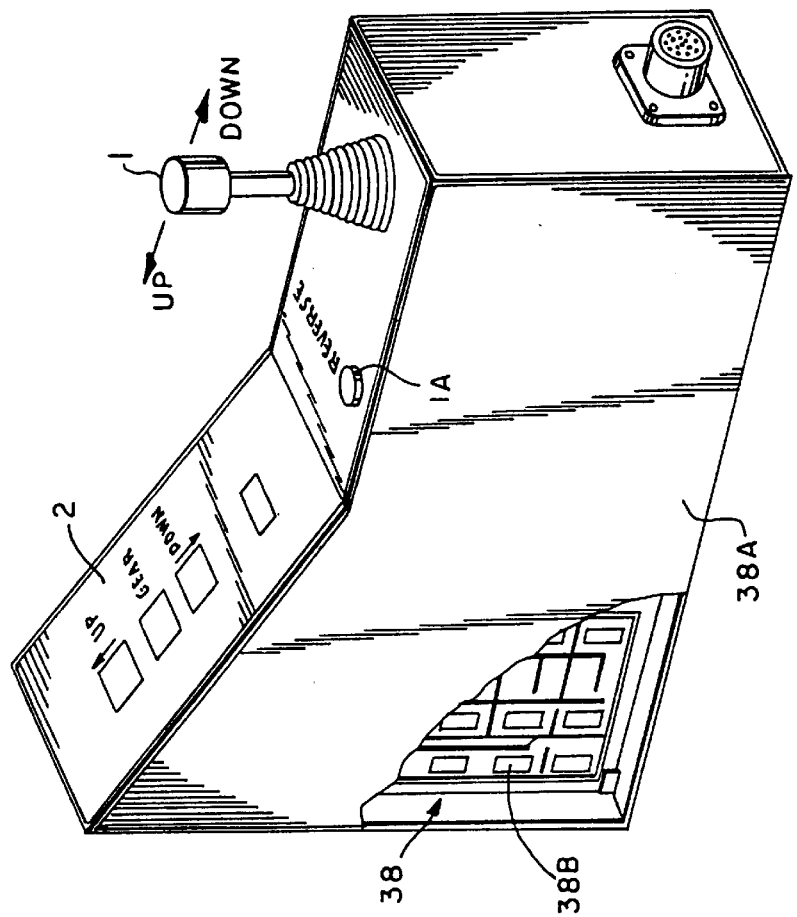
FIG. 2 is a perspective view of the driver's manual shift control and display device.

To shift transmission 12, the driver moves lever 1 forward (for upshifts) and rearward (for downshifts) from the position illustrated in FIGS. 2 and 3. To select a single upshift (i.e., a shift to seventh, gear), the operator will move lever 1 forward once and the lever will then return to the neutral or centered position under bias. If in sixth gear, as shown, the operator moves the lever forward three times in quick succession, each allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise discretion as to when to up- or downshift, and as to how many gear ratios to up- or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be selected only from the neutral, at-rest position and then is selected by moving control lever 1 backwardly from the currently engaged neutral position. To prevent an inadvertent "downshift" into reverse selection, a reverse button 1A may be provided, which button must be depressed prior to the central processing unit's interpreting a backward movement of the control lever 1 when in the neutral position as a request for reverse operation.

Of course, any type of toggle switch or button which may be located on the end of the shift lever may be utilized in place of reverse enagle button 1A.

In an alternative control (see allowed copending U.S. Ser. No. 08/104,699, the disclosure of which is incorporated herein by reference), if the lever is moved to and retain in a displaced position, the display will scroll through the allowable ratios in that direction, and will cause engagement of the ratio displayed at the time the lever is released from the displaced position thereof.

It is understood, especially for the more fully automated transmission systems, that a single control lever of the "P-R-N-D-L" type movable forward and backward in a given direction to select a forward and reverse mode of operation, and then movable in a transverse direction to select upshifts and downshifts either single or multiple, of the type disclosed in U.S. Pat. No. 4,442,730, the disclosure of which is incorporated herein by reference, may be substituted for the control lever 1, illustrated. The selector lever 1 also may be replaced by any other type of selection device having a non-displaced position and two distinct displaced positions, such as a rocker switch or the like.

A single movement or pulse of the lever is a movement of the lever from the centered position to a displaced position, in either the upshift or downshift direction, and then the immediate release of the lever, allowing the lever to return to the centered position thereof. If the control lever 1 is retained in the displaced position for more than a predetermined period of time (for example, for more than one or two seconds), an alternate control logic may be utilized.

According to the reverse ratio engagement control logic of the present invention, to prevent accidental/unintentional driving engagement of a reverse ratio, the controller 38 will not issue the commands required to drivingly engage a reverse ratio until the occurrence of a predetermined set of reverse ratio engagement enabling conditions is sensed. The term "drivingly engaged" is intended to mean engagement of a transmission ratio and the coupling(s), 16, drivingly interposed between the engine and the vehicle drive wheels (not shown).

Referring to the transmission 10, the predetermined reverse ratio engagement enabling conditions may comprise, for example (i) that the vehicle be at or near rest (i.e., $OS \leq REF_1$), (ii) that the transmission be allowed to remain in neutral for a period of time ($T_N \geq REF_2$), such as, for example, about one to two seconds, prior to selection of reverse, (iii) selection of reverse and then (iv) the operator presses the reverse button 1A, or retain the lever 1 in the downshift position for at least a period of time ($T_R \geq REF_3$), such as, for example, about one to two seconds. In a further example, as an alternate or additional condition, the application of vehicle brakes at the time of selecting reverse and/or for a period of time thereafter may be required. Of course, reverse button 1A may be located on selector 1, such as in the knob thereof.

As a further additional or alternative precondition to commanding engagement of a reverse ratio, manual disengagement of master clutch 16 by clutch pedal 3 may be required at the time of selection of reverse.

Figure 3A:
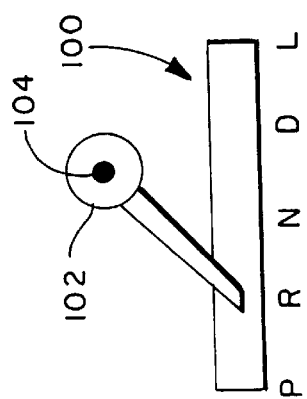
FIGS. 3A and 3B are schematic illustrations of alternative shift selection devices adapted for the present invention.
Figure 3B:
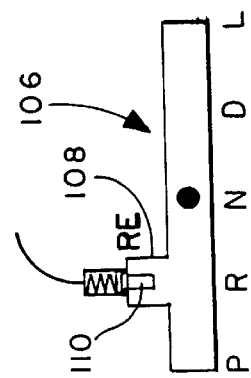

Referring to FIGS. 3A and 3B, shift patterns of the well-known "P-R-N-D-L" type are illustrated wherein "P" is for selection of park, "R" is for selection of reverse, "N" is for selection of neutral, "D" is for selection of drive and "L" is for selection of low.

In the selector of FIG. 3A, the selector lever 100 is provided with a knob 102 having a button 104 thereon. In this type of selector, one of the reverse enabling conditions may comprise depressing button 104 for a predetermined period of time. In the shift pattern 106 of FIG. 3B, a gated "RE" or reverse enabling slot 108 is provided with a spring-biased plunger/sensor 110 for resisting entry of the selector lever into the slot. The reverse enabling conditions for an automatic transmission system using shift pattern 106 will include causing the selector lever to remain in slot 108 against the bias of plunger 110 for greater than a reference period of time.

It is understood that the controller 38 may be provided with one or more timer devices or may determine time periods by counting cycles or using other known techniques.

Figure 4A:
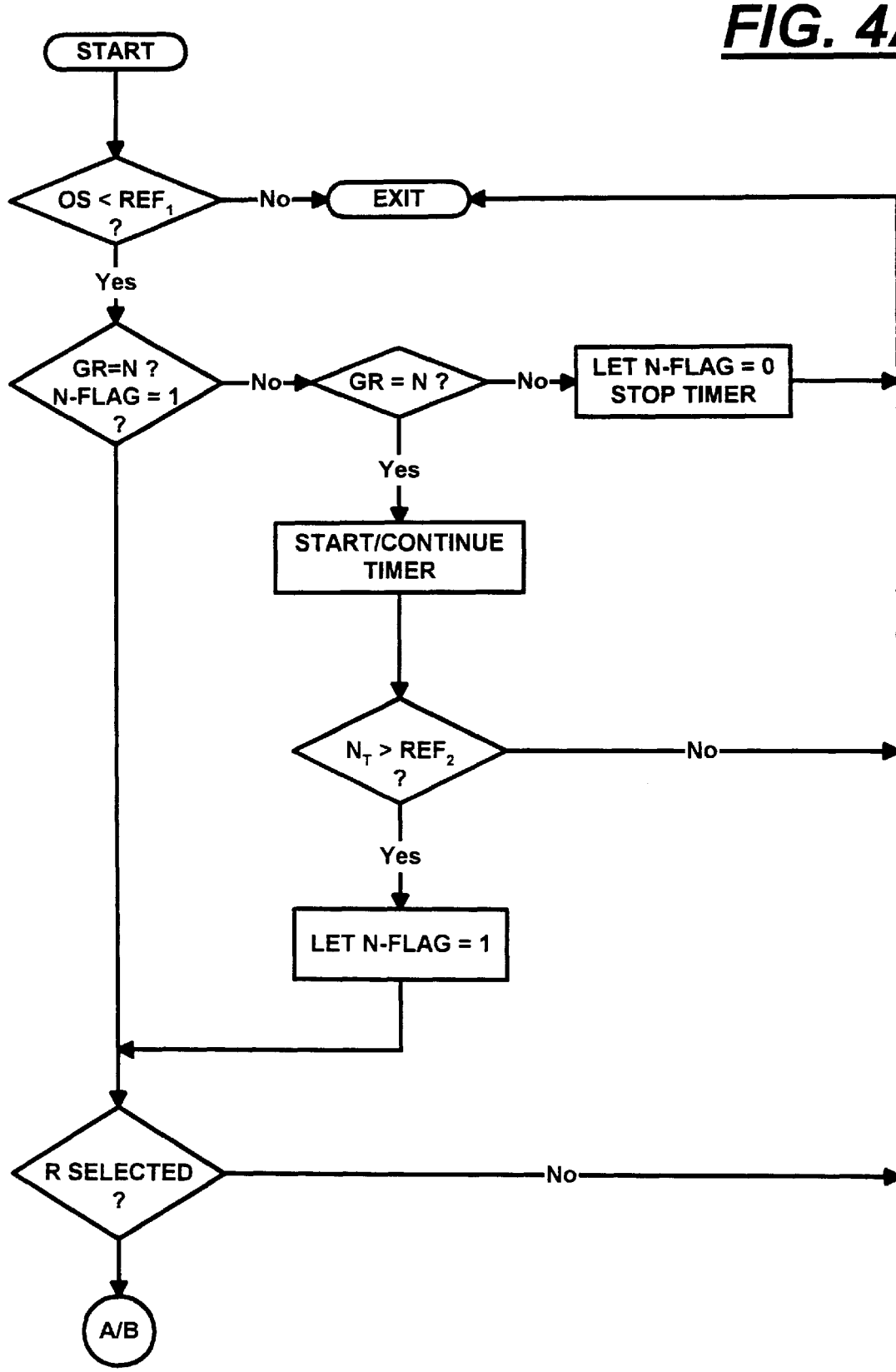
FIGS. 4A, 4B and 4C are schematic illustrations, in flow chart format, of the control system/method of the present invention.
Figure 4B:
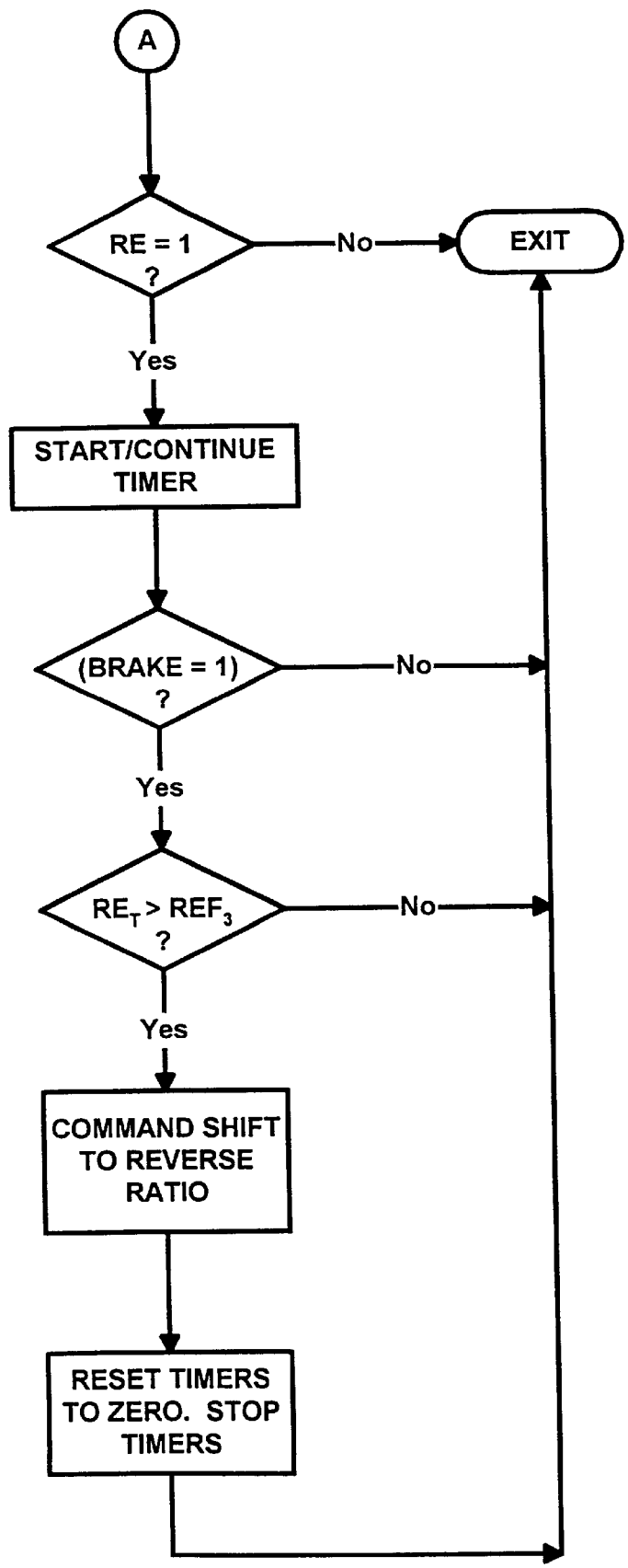
Figure 4C:
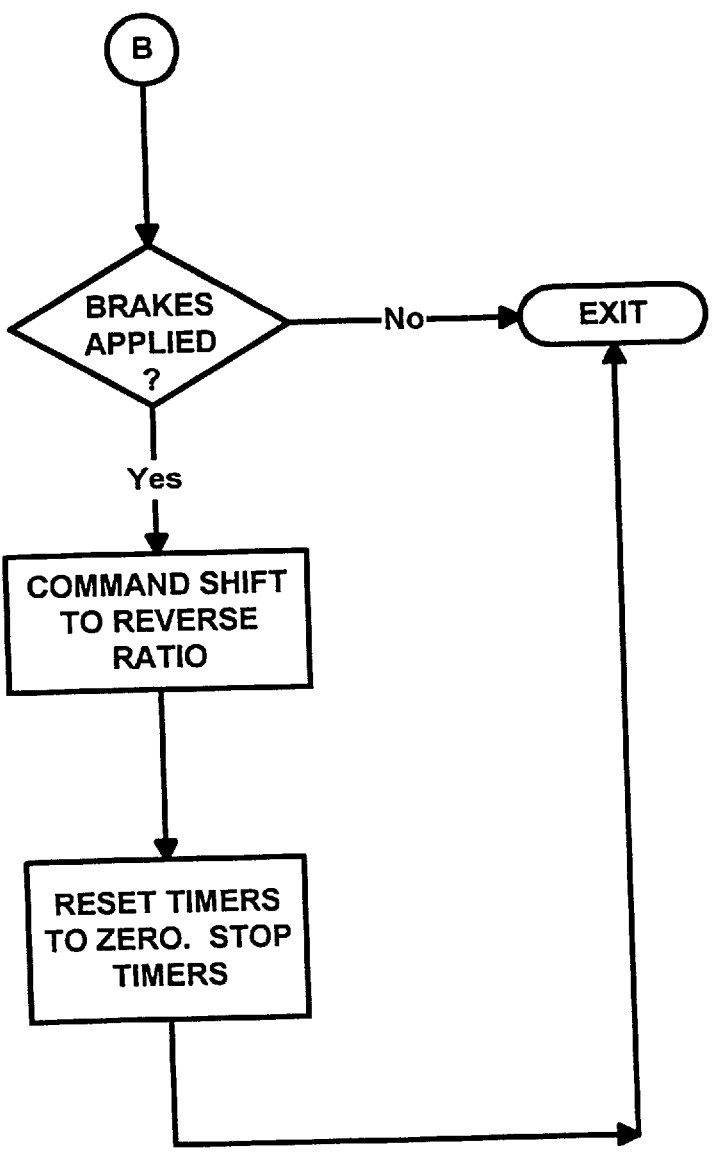

Two embodiments of the reverse ratio engagement control of the present invention are schematically illustrated, in flow chart format, in FIGS. 4A and 4B and in FIGS. 4A and 4C. In FIGS. 4A and 4B, application of the vehicle brakes is shown as a possible additional precondition for enabling engagement of transmission reverse ratio. In the embodiment of FIGS. 4A and 4C, application of the brakes is the operator-initiated enabling signal.

In accordance with the present invention, a reverse ratio engagement control is provided for automated vehicular transmissions which reduces the likelihood of accidental engagement of a reverse ratio requiring a mechanical interlock. The control of the present invention, however, may be utilized in connection with a mechanical interlock.

Although the preferred embodiment of the present invention has been described with a certain degree of particularity, various changes to form and detail may be made without departing from the spirit and scope of the invention as hereinafter claimed.

We claim:

1. A method of controlling engagement of a reverse ratio in an automated change-gear transmission system (10) comprising a fuel throttle-controlled engine (14), a multi-speed change-gear transmission (12) having a plurality of forward ratios and at least one reverse ratio, a manually operated shift selector for selecting forward, neutral and reverse modes of transmission operation (1), a central processing unit (38) for sensing operation of said manual shift selector and receiving input signals and for processing same according to predetermined logic rules to issue command output signals including command output signals for drivingly engaging said at least one reverse ratio to non-manually controlled operators including a transmission operator (34), said method comprising the steps of:

receiving a first input signal indicative of a time during which said shift selector has remained in the neutral selection position;

receiving a second input signal indicative of an operator selection of the reverse selection position; and issuing said command output signals to drivingly engage said at least one reverse drive ratio if said first input signal indicates that said shift selector has remained in the neutral selection position for at least a reference period of time ($N_T > REF_2$), or preventing issuance of said command output signals to prevent engagement of said at least one reverse drive ratio if said first input signal indicates that said shift selector has not remained in the neutral selection position for at least said reference period of time ($N_T \leq REF_2$).

2. The method of claim 1 wherein said command output signals for drivingly engaging said at least one reverse ratio are issued only upon sensing that an input signal indicative of vehicle speed is less than a reference ground speed signal value ($OS < REF_1$).

3. The method of claims 1 or 2 wherein said command output signals for drivingly engaging said at least one reverse ratio are issued only upon sensing an operator-initiated reverse ratio enabling signal for at least a reference period of time ($RE_T > REF_3$) after said operator selection of reverse.

4. The method of claim 3 wherein said command output signals for causing driving engagement of said at least one reverse ratio are issued only upon sensing an input signal indicative of application of the vehicle brakes after selection of reverse.

5. The method of claim 4 wherein said operator-initiated reverse ratio enabling signals are generated by the operator's positioning of a selection device in a predetermined position against a bias.

6. The method of claim 5 wherein said selection device is said shift selector.

7. The method of claim 5 wherein said shift selector is biased to a non-displaced position, is displaceable in a first direction to select upshifts and in a second direction to select downshifts, is effective to select a reverse ratio by displacement in said second direction when the transmission is in neutral and wherein said enabling signal is generated by retaining said shift selector displaced in the second direction.

8. The method of claim 3 wherein said operator-initiated reverse ratio enabling signals are generated by the operator's positioning of a selection device in a predetermined position against a bias.

9. The method of claim 8 wherein said selection device is said shift selector.

10. The method of claim 6 wherein said shift selector is biased to a non-displaced position, is displaceable in a first direction to select upshifts and in a second direction to select downshifts, is effective to select a reverse ratio by displacement in said second direction when the transmission is in neutral and wherein said enabling signal is generated by retaining said shift selector displaced in the second direction.

11. The method of claim 3 wherein said enabling reference period of time ($REF_3$) is about 1.0 to 2.0 seconds.

12. The method of claim 3 wherein said transmission system includes a master clutch (16) and a manually operated clutch control (3) and said command output signals for engaging said at least one reverse ratio are issued only upon sensing manual disengagement of said master clutch simultaneously with sensing said operator-initiated selection of reverse.

13. The method of claims 1 or 2 wherein said command output signals for causing driving engagement of said at least one reverse ratio are issued only upon sensing an input signal indicative of application of the vehicle brakes after said operator selection of reverse.

14. The method of claims 1 or 2 wherein said reference period of time ($REF_2$) is about 1.0 to 2.0 seconds.

15. The method of claims 1 or 2 wherein said transmission system includes a master clutch (16) and a manually operated clutch control (3) and said command output signals for engaging said at least one reverse ratio are issued only upon sensing manual disengagement of said master clutch simultaneously with sensing said operator-initiated selection of reverse.

16. A control system for controlling engagement of a reverse ratio in an automated change-gear transmission system (10) comprising a fuel throttle-controlled engine (14), a multi-speed change-gear mechanical transmission (12) having a plurality of forward ratios and at least one reverse ratio, a manually operated shift selector for selecting forward, neutral and reverse modes of transmission operation (1), a central processing unit (38) for sensing operation of said manual shift selector and receiving inputs and for processing same according to predetermined logic rules to issue command output signals including command output signals for drivingly engaging said at least one reverse ratio to non-manually controlled operators including a transmission operator (34), said control system characterized by logic rules including rules for:

receiving a first input signal indicative of a time during which said shift selector has remained in the neutral selection position;

receiving a second input signal indicative of an operator selection of the reverse selection position; and issuing said command output signals to drivingly engage said at least one reverse drive ratio if said first input signal indicates that said shift selector has remained in the neutral selection position for at least a reference period of time ($N_T > REF_2$), or preventing issuance of said command output signals to prevent engagement of said at least one reverse drive ratio if said first input signal indicates that said shift selector has not remained in the neutral selection position for at least said reference period of time ($N_T \leq REF_2$).

17. The control system of claim 16 wherein said command output signals for drivingly engaging said at least one reverse ratio are issued only upon sensing that an input signal indicative of vehicle speed is less than a reference ground speed signal value ($OS < REF_1$).

18. The control system of claims 16 or 17 wherein said command output signals for drivingly engaging said at least one reverse ratio are issued only upon sensing said operator-initiated reverse ratio enabling signal for at least an reference period of time ($RE_7 > REF_3$) after selection of reverse.

19. The control system of claim 18 wherein said command output signals for causing driving engagement of said at least one reverse ratio are issued only upon sensing an input signal indicative of application of the vehicle brakes after selection of reverse.

20. The control system of claim 19 wherein said operator-initiated reverse ratio enabling signals are generated by the operator's positioning of a selection device in a predetermined position against a bias.

21. The control system of claim 20 wherein said selection device is said shift selector.

22. The control system claim 20 wherein said shift selector is biased to a non-displaced position, is displaceable in a first direction to select upshifts and in a second direction to select downshifts, is effective to select a reverse ratio by displacement in said second direction when the transmission is in neutral and wherein said enabling signal is generated by retaining said shift selector displaced in the second direction.

23. The control system of claim 18 wherein said operator-initiated reverse ratio enabling signals are generated by the operator's positioning of a selection device in a predetermined position against a bias.

24. The control system of claim 23 wherein said selection device is said shift selector.

25. The control system of claim 23 wherein said shift selector is biased to a non-displaced position, is displaceable in a first direction to select upshifts and in a second direction to select downshifts, is effective to select a reverse ratio by displacement in said second direction when the transmission is in neutral and wherein said enabling signal is generated by retaining said shift selector displaced in the second direction.

26. The system of claim 18 wherein said enabling reference period of time ($REF_3$) is about 1.0 to 2.0 seconds.

27. The control system of claim 14 wherein said transmission system includes a master clutch (16) and a manually operated clutch control (3) and said rules include rules for issuing said command output signals for engaging said at least one reverse ratio only upon sensing manual disengagement of said master clutch simultaneously with sensing said operator-initiated selection of reverse.

28. The control system of claims 16 or 17 wherein said command output signals for causing driving engagement of said at least one reverse ratio are issued only upon sensing an input signal indicative of application of the vehicle brakes after said operator-initiated selection of reverse.

29. The control system of claims 16 or 17 wherein said reference period of time ($REF_2$) is about 1.0 to 2.0 seconds.

30. The control system of claims 16 or 17 wherein said transmission system includes a master clutch (16) and a manually operated clutch control (3) and said rules include rules for issuing said command output signals for engaging said at least one reverse ratio only upon sensing manual disengagement of said master clutch simultaneously with sensing said operator-initiated selection of reverse.

* * * * *